United States Patent Office 2,993,765
Patented July 25, 1961

2,993,765
GASOLINES CONTAINING ACID-TREATED BORATED OXAZOLINES
Sarah H. Belden, Cleveland, Ohio, assignor to The Standard Oil Company, Cleveland, Ohio, a corporation of Ohio
No Drawing. Filed Feb. 25, 1959, Ser. No. 795,348
Claims priority, application Great Britain Mar. 3, 1958
7 Claims. (Cl. 44—63)

This invention relates to novel boron compounds and to gasolines containing the same.

Co-pending application Serial No. 795,349, filed of even date herewith, which is assigned to my assignee and of which I am a co-inventor, discloses a class of novel borated oxazoline compounds for use in gasoline which are selected from the group consisting of (1)

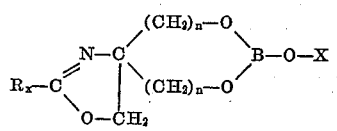

where X is selected from the group consisting of hydrogen and

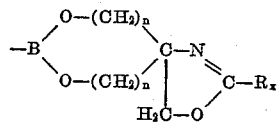

and (2)

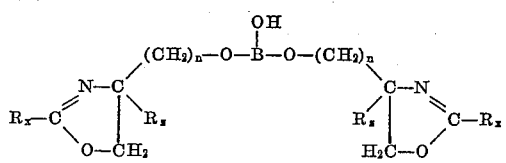

wherein $R_x$ represents an aliphatic hydrocarbon radical containing 7 to 19 carbon atoms, where $n$ is a small whole number from 1 to 3, and where $R_z$ represents a radical selected from the group consisting of hydrogen and a lower alkyl radical containing 1 to 3 carbon atoms.

A gasoline containing small amounts of a boron compound selected from this group of compounds is disclosed as offering improved engine operation, being particularly effective in suppressing surface ignition and in alleviating carburetor deposits and carburetor icing. These boron compounds are particularly desirable for use as additives for gasoline because, in contradistinction to many other organo boron compounds, they exhibit excellent stability toward hydrolysis in pure form and when dissolved in gasoline. Further information as to the nature of these compounds, the manner in which they may be prepared, and the benefits which may be derived from the gasoline in which they are incorporated may be gained from said application Serial No. 795,349, and the description of said application Serial No. 795,349 is incorporated herein by reference to such an extent as is required for a complete understanding of these compounds.

It has now been found that such borated oxazoline compounds may be further improved for use as a gasoline additive by further reaction with an acid. The present invention is not to be limited to any particular theory with respect to the manner in which the acid adds to the borated oxazoline compounds, but it is believed that the acid coordinates with the nitrogen atom present in the oxazoline ring resulting in the formation of a salt.

The pH of the borated oxazoline compound is lowered almost immediately upon mixing at ambient temperature with the desired amount of acid. Water of reaction may be formed in the reaction, depending upon the acid used and its form. In some instances it will be desired to remove this water before incorporating the additive into gasoline. Where it is desired to remove the water of reaction in the preparation, the borated oxazoline may be reacted with the acid in the presence of a solvent which azeotropes with water, such as benzene. The reaction mixture is then refluxed at the azeotropic distillation temperature for a time to effect the removal of the water with the solvent.

In particular, gasolines containing the compounds of the present invention exhibit improved resistance over gasolines containing the untreated borated oxazoline compounds toward emulsification with water which may be in contact with the gasoline. The commercial import of such improvement will readily be recognized when it is considered that in large scale manufacturing and marketing operation, gasoline must be placed in storage tanks at bulk stations, filling stations, and in individual cars for prolonged periods of time, all of which normally contain appreciable amounts of water at the bottom thereof. Equally important, the compounds of the present invention provide a highly desirable means for introducing to the borated oxazoline compound and to the gasoline containing them additional amounts of boron or other highly desirable elements which offer additional benefits in engine operation. For example, when phosphoric acid is used to acid treat the borated oxazoline, both boron and phosphorus are introduced to the motor fuel through the agency of one compound and may eliminate the need for supplying a second additive to the fuel which is otherwise added to provide elemental phosphorus to the fuel.

The above and other beneficial effects are gained when the acid-treated boron compounds of this invention are incorporated in gasoline in amounts between 0.0025 to 0.05% by weight, with amounts from 0.02 to 0.05% by weight being preferred.

The acid that is used to treat the borated oxazoline should be a non-oxidizing acid, and boric, phosphoric, hydrochloric, acetic, and oxalic, or mixtures thereof, or anhydrides thereof, are illustrative. The oxidizing acids such as nitric, sulfuric, perchloric, peracetic, etc. are not preferred. The amount of the acid should be such as to lower the pH value of the resulting product, as determined at 25% of the final product in benzene in accordance with techniques described in ASTM–D664–54 from about 6.7 to a range of from 3.0 to 6.0, and preferably 3.3 to 5.7. The choice of the acid or acids to be used will, of course, be determined by economics, pH considerations, and by the performance benefits which are desired.

The following examples are in no way intended to limit the invention but are presented to typify the process of this acid addition to borated oxazoline compounds of which Example A below is exemplary, and to illustrate the reaction products that are obtained thereby.

EXAMPLE A 100 parts of 2-heptadecenyl 4,4-bis-(hydroxy methyl) oxazoline was dissolved in 200 parts of benzene. 16.8 parts of boric acid was then added (a 1:1 molar ratio) and the mixture refluxed at the azeotropic distillation temperature for the removal of water with the benzene overhead from the reaction mixture. The remainder of the benzene was distilled off. The reaction proceeds readily in accordance with the following equation:

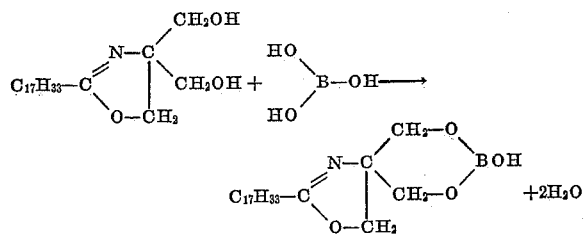

The reaction product was a clear liquid upon cooling and was soluble in gasoline. Its pH was 6.7.

EXAMPLE 1

100 parts of borated 2-heptadecenyl 4,4-bis-(hydroxy methyl) oxazoline having the formula $C_{22}H_{41}NBO_4$, as made in accordance with Example A, was reacted with 15.2 parts of acetic acid (a 1:1 molar ratio) in 200 parts of benzene and refluxed at the azeotropic distillation temperature for several hours for the removal of water with the benzene. Upon cooling, the reaction product was clear and readily soluble in gasoline. The pH of the reaction product was 5.7.

EXAMPLE 2

100 parts of borated 2-heptadecenyl 4,4-bis-(hydroxy methyl) oxazoline having the formula $C_{22}H_{41}NBO_4$ was reacted with 6.1 parts of $P_2O_5$ (a 1:0.17 molar ratio) and 5 parts water in 200 parts of benzene and refluxed at the azeotropic distillation temperature for two hours. The reaction product upon cooling was clear and readily soluble in gasoline. The pH of the product was 4.2.

EXAMPLE 3

100 parts of borated 2-heptadecenyl 4,4-bis-(hydroxy methyl) oxazoline having the formula $C_{22}H_{41}NBO_4$ was reacted with 16.1 parts of oxalic acid dihydrate (a 1:0.5 molar ratio) in 200 parts of benzene and refluxed at the azeotropic distillation temperature for several hours for the removal of water with benzene. The reaction product upon cooling was clear and readily soluble in gasoline. The pH of the reaction product was 3.3.

The results in Table I below illustrate the improvement toward emulsification characteristics obtained with gasolines containing the acid-treated borated oxazoline compounds of this invention.

The results reported were obtained in accordance with Aviation Gasoline Water Tolerance Test as set forth in ASTM–D1094–53. In this test, 20 ml. of water is shaken with 80 ml. of gasoline in a graduated cylinder for 2 minutes at ambient temperature. The change of hydrocarbon level is then observed. The lower the change of hydrocarbon volume, the less tendency the gasoline has to emulsify with the water. In addition, in the present test the cuff height, which normally appears as a distinct and cloudy layer between the hydrocarbon phase and the water phase, was also measured. The lower the cuff height, the less tendency the gasoline has to emulsify with water. In all runs the gasoline tested was the same except for the additive. The test was run on borated 2-heptadecenyl 4,4-bis-(hydroxy methyl) oxazoline (Additive No. A which is the product of Example A above) and acid-treated derivatives of the same (Additives Nos. 1 to 5). Additives Nos. 1 to 5 were prepared by treating Additive No. A with different acids in an amount sufficient to furnish 1 mole of hydrogen per mole of borated oxazoline, and Additive Nos. 1 to 3 correspond to the products of Examples 1 to 3 above, respectively. The quantity of borated 2-heptadecenyl 4,4-bis-(hydroxy methyl) oxazoline in each gasoline was the same and was an amount to supply 0.001% by weight boron to the gasoline. The pH of each of the additives is given in Table I to indicate the relationship of the pH value of the additives to cuff height and change of hydrocarbon volume.

Table I

| No. | Additive | pH | Ml. of Hydrocarbon Change | Ml. of Cuff Height |
|---|---|---|---|---|
| A | Borated 2-heptadecenyl 4,4-bis-(hydroxy methyl) oxazoline. | 6.7 | −3 | 23 |
| 1 | Borated 2-heptadecenyl 4,4-bis-(hydroxy methyl) oxazoline+Acetic Acid. | 5.7 | −3 | 8 |
| 2 | Borated 2-heptadecenyl 4,4-bis-(hydroxy methyl) oxazoline+Phosphoric Acid. | 4.2 | 0 | 5 |
| 3 | Borated 2-heptadecenyl 4,4-bis-(hydroxy methyl) oxazoline+Oxalic Acid. | 3.3 | −2 | 12 |
| 4 | Borated 2-heptadecenyl 4,4-bis-(hydroxy methyl) oxazoline+Boric Acid. | 6.6 | −2 | 22 |
| 5 | Borated 2-heptadecenyl 4,4-bis-(hydroxy methyl) oxazoline+Hydrochloric Acid. | 2.9 | −1 | 21 |

As may be seen from Table I, a smaller cuff height is noted between a pH range of from 5.7 to 3.3. Furthermore, in Table I the hydrocarbon volume change is indicated to be at an optimum at a pH of 4.2.

The same test was run on a series of gasoline compositions incorporating additives covering the same pH range provided in Table I, said additives being prepared by treating borated 2-heptadecenyl 4,4-bis-(hydroxy methyl) oxazoline with varying amounts of hydrochloric acid. These results are recorded in Table II below. The base gasoline was the same for all tests and the amount of additive added to the fuel was sufficient to supply 0.001% by weight boron to the gasoline in each instance.

Table II

| Additive | pH | Ml. of Cuff Height |
|---|---|---|
| Borated 2-heptadecenyl 4,4-bis-(hydroxy methyl) oxazoline | 6.7 | 23 |
| Borated 2-heptadecenyl 4,4-bis-(hydroxy methyl) oxazoline+Hydrochloric Acid | 4.4 | 23 |
| Do | 4.0 | 5 |
| Do | 2.9 | 21 |

It will be observed that the lowest cuff height is observed when the pH value of the additive is 4.0, which corresponds to the most favorable pH value for the additives shown in Table I above. This indicates strongly that the optimum pH value remains the same irrespective of the acid employed for treating the borated oxazoline compound, although the over-all pH range which will offer improvements toward emulsification may vary slightly from acid to acid or from varying mixtures thereof.

Borated oxazoline compounds from the class disclosed in said co-pending application Serial No. 795,349 exhibit in themselves excellent engine performance with respect to surface ignition suppression. The following engine test will indicate that further improvements toward surface ignition suppression may be derived by the selected acid treating of the borated oxazoline compounds in accordance with the present invention.

An ASTM–CFR single-cylinder engine having a compression ratio adjusted at 12:1 was employed in this test. Preparatory to the test cycle, the engine was run open throttle at 900 r.p.m. for thirty minutes to stabilize the engine conditions for the test period. Following this, the engine was continued at open throttle continuously for three hours, during which time the total surface ignition count was observed electronically. All experimental conditions were the same for each test except the gasoline.

The base fuel in each test was the same and had the following composition and specifications:

Composition:
- Ultraformate _____ percent__ 59.8
- Catalytic distillate _____ do____ 30.0
- Light naphtha _____ do____ 10.0
- Solvent oil _____ do____ 0.2
- Tetraethyl lead (motor mix) _____ ml./gal__ 3.0
- API gravity _____ 49.7

Engler distillation:
- IBP _____ °F__ 80
- 10% _____ do____ 155
- 30% _____ do____ 202
- 50% _____ do____ 263
- 70% _____ do____ 310
- 90% _____ do____ 377
- EP _____ do____ 452
- Reid vapor pressure _____ 6.5

The number of surface ignitions in the additive fuel is expressed as percentage of the surface ignitions of the blank fuel with the results as follows:

*Table III*

| Additive | Concentration | SI Rating of Fuel | |
|---|---|---|---|
| | | Total SI | Audible SI |
| None | None | 100 | 100 |
| Additive A in Table I. | To supply 0.002% by wt. boron. | 26 | 42 |
| Additive A+Tolyl Dimethyl Phosphate. | Additive A in amount to supply 0.002% by wt. boron and tolyl dimethyl phosphate in amount to supply 0.002% by wt. phosphorus. | 40 | 40 |
| Additive 2 in Table I. | To supply 0.002% by wt. boron and .002% by wt. phosphorus. | 14 | 13 |

It will be seen from Table III that Additive No. 2, which is Additive No. A treated with phosphoric acid in an amount so that 1 mole of hydrogen is supplied for each mole of borated oxazoline compound present, gives a surprising and unexpected improvement over Additive No. A in suppressing surface ignition. The results obtained for Additive No. 2 is even more surprising in light of the fact that an equivalent amount of phosphorus incorporated through means of a second compound, tolyl dimethyl phosphate, shows little effect over Additive No. A in the audible rating and a poorer effect in the total SI rating. Additive No. 2 has a pH value of 4.2 which, as disclosed hereinbefore, provides optimum results for resisting the tendency of the gasoline to emulsify with water.

I claim:

1. A motor fuel for internal combustion engines consisting essentially of a leaded gasoline and a boron compound prepared by reacting a borated oxazoline compound selected from the group consisting of (1)

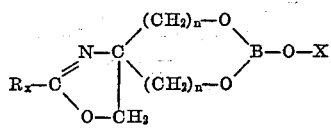

where X is selected from the group consisting of hydrogen and

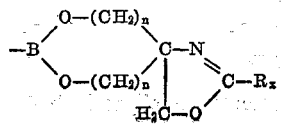

and (2)

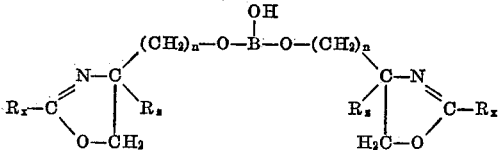

where $R_x$ represents an aliphatic hydrocarbon radical containing 7 to 19 carbon atoms, where $n$ is a small whole number from 1 to 3, and where $R_z$ represents a radical selected from the group consisting of hydrogen and a lower alkyl radical containing 1 to 3 carbon atoms; with a non-oxidizing acid in an amount so that the resulting product has a pH value in a range of from 3.0 to 6.0, the amount of said boron compound being from 0.0025 to 0.05% by weight based on said fuel.

2. A motor fuel for internal combustion engines consisting essentially of a leaded gasoline and a boron compound prepared by reacting a borated oxazoline compound selected from the group consisting of (1)

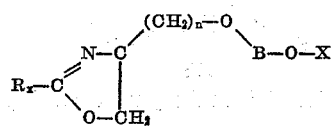

where X is selected from the group consisting of hydrogen and

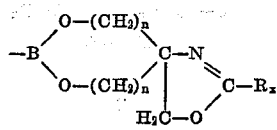

and (2)

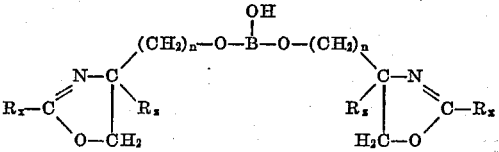

where $R_x$ represents an aliphatic hydrocarbon radical containing 7 to 19 carbon atoms, where $n$ is a small whole number from 1 to 3, and where $R_z$ represents a radical selected from the group consisting of hydrogen and a lower alkyl radical containing 1 to 3 carbon atoms; with an acid selected from the group consisting of boric, phosphoric, hydrochloric, acetic, and oxalic, and mixtures thereof, in an amount so that the resulting product has a pH value in a range of from 3.0 to 6.0, the amount of said boron compound being from 0.0025 to 0.05% by weight based on said fuel.

3. A motor fuel for internal combustion engines consisting essentially of a leaded gasoline and a boron compound prepared by reacting a borated oxazoline compound selected from the group consisting of (1)

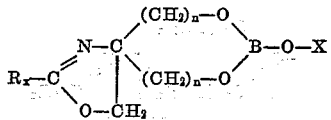

where X is selected from the group consisting of hydrogen and

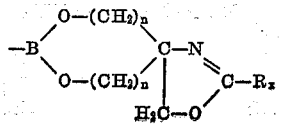

and (2)

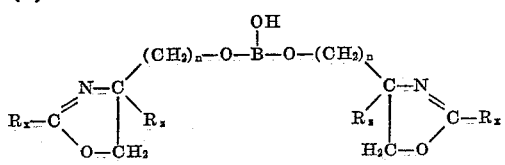

where $R_x$ represents an aliphatic hydrocarbon radical containing 7 to 19 carbon atoms, where $n$ is a small whole number from 1 to 3, and where $R_z$ represents a radical selected from the group consisting of hydrogen and a lower alkyl radical containing 1 to 3 carbon atoms; with boric acid in an amount so that the resulting acid-treated boron compound has a pH value in a range of from 3.0 to 6.0, the amount of said boron compound being from 0.02 to 0.05% by weight based on said fuel.

4. A motor fuel for internal combustion engines consisting essentially of a leaded gasoline and a boron compound prepared by reacting a borated oxazoline compound selected from the group consisting of (1)

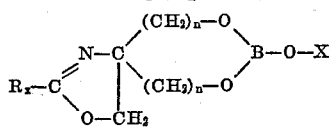

where X is selected from the group consisting of hydrogen and

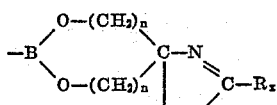

and (2)

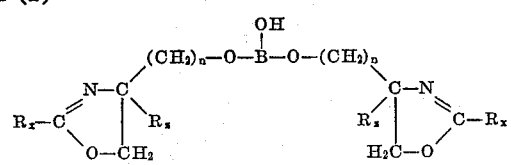

where $R_x$ represents an aliphatic hydrocarbon radical containing 7 to 19 carbon atoms, where $n$ is a small whole number from 1 to 3, and where $R_z$ represents a radical selected from the group consisting of hydrogen and a lower alkyl radical containing 1 to 3 carbon atoms; with phosphoric acid in an amount so that the resulting acid-treated boron compound has a pH value in a range of from 3.0 to 6.0, the amount of said boron compound being from 0.02 to 0.05% by weight based on said fuel.

5. A motor fuel for internal combustion engines consisting essentially of a leaded gasoline and a boron compound prepared by reacting a borated oxazoline compound selected from the group consisting of (1)

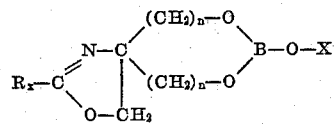

where X is selected from the group consisting of hydrogen and

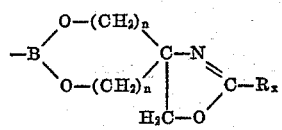

and (2)

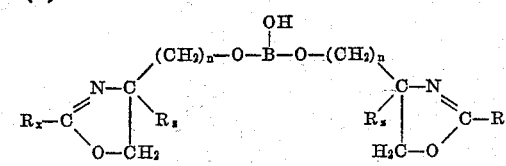

where $R_x$ represents an aliphatic hydrocarbon radical containing 7 to 19 carbon atoms, where $n$ is a small whole number from 1 to 3, and where $R_z$ represents a radical selected from the group consisting of hydrogen and a lower alkyl radical containing 1 to 3 carbon atoms; with hydrochloric acid in an amount so that the resulting acid-treated boron compound has a pH value in a range of from 3.0 to 6.0, the amount of said boron compound being from 0.02 to 0.05% by weight based on said fuel.

6. A motor fuel for internal combustion engines consisting essentially of a leaded gasoline and a boron compound prepared by reacting a borated oxazoline compound selected from the group consisting of (1)

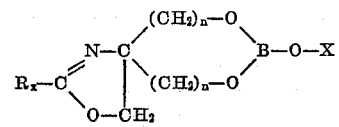

where X is selected from the group consisting of hydrogen and

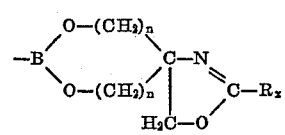

and (2)

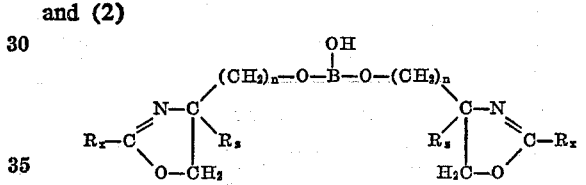

where $R_x$ represents an aliphatic hydrocarbon radical containing 7 to 19 carbon atoms, where $n$ is a small whole number from 1 to 3, and where $R_z$ represents a radical selected from the group consisting of hydrogen and a lower alkyl radical containing 1 to 3 carbon atoms; with acetic acid in an amount so that the resulting acid-treated boron compound has a pH value in a range of from 3.0 to 6.0, the amount of said boron compound being from 0.02 to 0.05% by weight based on said fuel.

7. A motor fuel for internal combustion engines consisting essentially of a leaded gasoline and a boron compound prepared by reacting a borated oxazoline compound selected from the group consisting of (1)

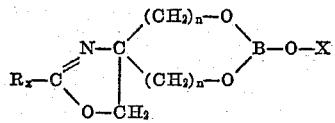

where X is selected from the group consisting of hydrogen and

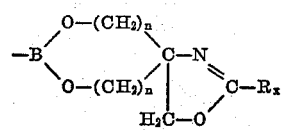

and (2)

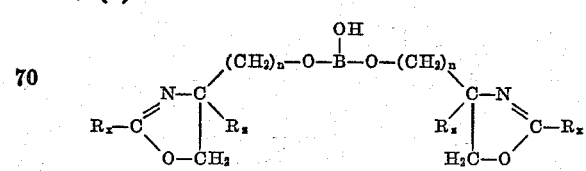

where $R_x$ represents an aliphatic hydrocarbon radical containing 7 to 19 carbon atoms, where $n$ is a small whole number from 1 to 3, and where $R_z$ represents a radical selected from the group consisting of hydrogen and a lower alkyl radical containing 1 to 3 carbon atoms; with oxalic acid in an amount so that the resulting acid-treated boron compound has a pH value in a range of from 3.0 to 6.0, the amount of said boron compound being from 0.02 to 0.05% by weight based on said fuel.

References Cited in the file of this patent

UNITED STATES PATENTS

| | | |
|---|---|---|
| 2,442,582 | Bishop | June 1, 1948 |
| 2,450,807 | McCarthy | Oct. 5, 1948 |
| 2,504,951 | Tryon | Apr. 25, 1950 |
| 2,668,100 | Luvisi | Feb. 2, 1954 |
| 2,741,548 | Darling et al. | Apr. 10, 1956 |